United States Patent Office 3,321,520
Patented May 23, 1967

3,321,520
IMINOCYCLOHEPTATRIENES AND A PROCESS FOR PREPARING THE SAME
Genshun Sunagawa, Nobuo Soma, and Junichi Nakazawa, Tokyo, Japan, assignors to Sankyo Company, Limited, Tokyo, Japan
No Drawing. Filed July 31, 1964, Ser. No. 386,734
Claims priority, application Japan, Aug. 7, 1963, 38/40,610
8 Claims. (Cl. 260—566)

This invention relates to iminocycloheptatriene derivatives and a process for preparing the same. More particularly, it relates to iminocycloheptatriene derivatives having the formula

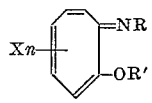

(I)

wherein X represents hydrogen, chloro, bromo, alkyl of 1 to 3 carbon atoms, methoxy, nitro or phenyl and can be the same or different when $n$ is 2, $n$ is an integer of 1 to 2, R represents hydrogen, alkyl of 1 to 2 carbon atoms, dimethylamino, β-dimethylaminoethyl, phenylamino, p-tolyl or benzyl and R′ is alkyl of 1 to 2 carbon atoms, and a process for preparing the same.

Iminocycloheptatriene derivatives produced by the process according to this invention are novel compounds which are useful as intermediates for drugs. For example, 1-methoxy-7-iminocycloheptatriene obtained according to the process of this invention is reacted with methylamine to give 1-methylamino-7-methyliminocycloheptatriene, a useful compound which possesses potent analgesic and anti-inflammatory activities.

According to the present invention, the iminocycloheptatriene derivatives having the above-mentioned Formula I are produced by reacting an aminotropone derivative having the formula

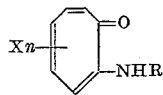

(II)

wherein X, R and $n$ have the same meanings as above with a lower alkylsulfate or a lower alkyl benzene or toluene sulfonate. In order to alkylate aminotropones to produce N-methylaminotropones we have first conducted reaction of aminotropone with dimethylsulfate with an unexpected result that no N-methylaminotropone but a novel compound, 1-methoxy-7-iminocycloheptatriene, is produced. This reaction is without doubt a novel reaction which has been found that it can be applied to N-substituted aminotropone derivatives too and, moreover, any substituent on the seven-membered ring does not interfere with the reaction. Such a wide scope of application of the reaction of this invention is interesting. The only essential condition for the reaction of this invention is presence of at least one hydrogen atom in the amino group of aminotropone derivatives.

The reaction of this invention is effected using as the lower alkylsulfate, di-lower alkylsulfates such as dimethyl- or diethyl-sulfate and mono-alkylsulfates such as monomethyl- and monoethyl-sulfate. As the lower alkyl ester of active sulfonic acid are ordinarily used methyl benzenesulfonate, methyl and ethyl toluenesulfonates and the like. In this case, the reaction may be effected with any lower alkyl group, but it is desired to use the reagent with alkyl group containing 1–5 carbon atoms. The reaction is carried out in the presence or absence of an inert organic solvent such as benzene, toluene or dioxane. Any other organic solvent that will not be reacted with the reactants may be used for the reaction. It is preferred that the reaction temperature in the presence of solvent is refluxing temperature of the solvent and one in the absence of solvent 100–150° C. However, temperatures higher or lower than the above may be used for the reaction.

After completion of the reaction, the reaction mixture is subjected to extraction with water, following removal of the solvent if the reaction is carried out in the presence of water-miscible organic solvent, or without any additional procedure if the reaction is carried out in the presence or absence of water-immiscible inert solvent. The extract is then made alkaline to precipitate crystals, which are separated by filtration. Alternatively, the alkaline mixture containing the crystals is extracted with an organic solvent such as benzene or chloroform. The extract is conventionally washed with water, dried over anhydrous sodium sulfate and the solvent is removed by distillation under reduced pressure. The residue is purified by distillation under reduced pressure or by chromatographic procedure. Alternatively, the reaction mixture may be extracted with water and the aqueous layer washed with benzene, followed by addition of aqueous solution of picric acid to separate the desired product as an insoluble salt.

The aminotropones used as the starting material in the process of this invention are produced by reacting a corresponding tropone with hydrazine or by amination of a corresponding alkoxytropone or a corresponding halogenotropone.

The following examples are given to illustrate this invention but are not intended to limit the scope of the invention in any sense.

Example 1

A mixture of 3.0 g. of 2-aminotropone and 6.0 g. of dimethylsulfate in 30 ml. of toluene is heated under reflux with stirring for 6 hours. After cooling, the reaction mixture is extracted with water and the extract is made alkaline with sodium hydroxide followed by extraction with benzene. The benzene extract is dried over potassium carbonate and the benzene is removed by distillation under reduced pressure to give 2.8 g. of 1-methoxy-7-imino-1.3.5-cycloheptatriene as an oil. Picrate, M.P. 213° C.

The compound thus obtained is used for the synthesis of useful compound by the following procedure.

To a solution of 1.0 g. of 1-methoxy-7-imino-1.3.5-cycloheptatriene in 20 ml. of 50% methanol are added 15 ml. of 40% aqueous solution of monomethylamine and 3 ml. of 10% hydrochloric acid. The mixture is allowed to stand overnight, followed by concentration under reduced pressure. To the concentrate is added water to precipitate crystals, which are separated by filtration. Recrystallization from methanol gives 1.1 g. of 1-methylamino - 7 - methylimino-1.3.5-cycloheptatriene as yellow leaves melting at 62° C.

Example 2

A mixture of 1 g. of 2-aminotropone and 2 g. of diethylsulfate is heated on an oil bath at 110° C. for 15 min. After cooling, water is added to the reaction mixture and an oily substance being insoluble is removed by extraction with benzene. To the aqueous layer is added 40% aqueous sodium hydroxide to make it strongly alkaline. There is precipitated a pale brown oily substance, which is extracted with benzene. The extract is dried over potassium carbonate and the benzene is removed by distillation under reduced pressure to give 1 g. of oily 1 - ethoxy - 7-imino-1.3.5-cycloheptatriene. Picrate, M.P. 202° C.

Example 3

A mixture of 3.0 g. of 2-methylaminotropone and 6.0 g. of dimethylsulfate in 30 ml. of toluene is heated under reflux with stirring for 4.5 hours. After cooling, the reaction mixture is extracted with water and the crystals then precipitated are separated by filtration. The resulting aqueous solution is made alkaline with sodium hydroxide followed by extraction with chloroform. The chloroform extract is washed with water and dried over sodium sulfate. The solvent is removed from the extract by distillation and the residue is subjected to distillation under reduced pressure to give 2.2 g. of a yellowish orange oil, B.P. 65° C./0.03 mm. Hg. The substance is 1-methoxy-7-methylimino-1.3.5-cycloheptatriene; picrate, yellow crystals melting at 163° C.

Example 4

A mixture of 1.5 g. of 2-benzylaminotropone and 3.0 g. of dimethylsulfate in 15 ml. of toluene is heated under reflux with stirring for 5 hours. After cooling, the reaction mixture is extracted with water. The aqueous solution is made alkaline with sodium hydroxide, followed by extraction with benzene. The benzene solution is dried over potassium carbonate and the solvent is removed from the extract by distillation under reduced pressure to give 1.2 g. of oily 1-methoxy-7-benzylimino-1.3.5-cycloheptatriene. Picrate, yellow crystals melting at 115° C.

Example 5

A mixture of 1.0 g. of 2-($\beta$-dimethylamino-ethylamino)tropone and 2 g. of dimethylsulfate in 10 ml. of toluene is heated under reflux with stirring for 3 hours. After cooling, the reaction mixture is extracted with water and the aqueous layer is washed with benzene. Addition of aqueous solution of picric acid to the aqueous solution gives dipicrate of 1-methoxy-7-($\beta$-dimethylamino-ethylimino)-1.3.5-cycloheptatriene melting at 185–186° C.; yield, 1.9 g.

Example 6

A mixture of 1 g. of 2-(p-toluidino)tropone and 5 ml. of dimethylsulfate is heated with stirring at 110–120° C. for 5 hours. After cooling, the reaction mixture is concentrated under reduced pressure, followed by addition of water to the concentrate. The resulting mixture is washed with benzene and the aqueous solution is made alkaline with sodium hydroxide, followed by extraction with benzene. The benzene extract is dried over sodium sulfate and the benzene is removed by distillation under reduced pressure to give. 0.7 g. of oily 1-methoxy-7-(p-tolylimino)-1.3.5-cycloheptatriene. Picrate, M.P. 133°.

Example 7

A mixture of 1.5 g. of 2-phenylhydrazinotropone and 3.0 g. of dimethylsulfate in 20 ml. of toluene is heated at 95° C. for 1.5 hours. After cooling, the reaction mixture is extracted with water. The aqueous solution is treated with active charcoal and then neutralized with aqueous sodium bicarbonate to precipitate crystals. The crystals are separated by filtration and dissolved in benzene. The benzene solution is chromatographed on alumina followed by recrystallization from cyclohexane. There is obtained 1-methoxy-7-phenylhydrazino-1.3.5-cycloheptatriene melting at 127° C.; yield 0.9 g.

Example 8

A mixture of 5.0 g. of 2-dimethylhydrazinotropone and 10.0 ml. of dimethylsulfate in 75 ml. of toluene is heated under reflux with stirring for 3 hours. After cooling, the reaction mixture is extracted with water and the aqueous solution is made alkaline with sodium hydroxide followed by extraction with benzene. The benzene extract is dried over sodium sulfate and the benzene is removed by distilaltion under reduced pressure. The residual crystals are recrystallized from cyclohexane to give 3.5 g. of 1-methoxy-7-dimethylhydrazino-1.3.5-cycloheptatriene melting at 60° C.

Example 9

A mixture of 1 g. of 5-chloro-2-ethylaminotropone and 2 g. of dimethylsulfate in 10 ml. of toluene is heated under reflux with stirring for 3 hours. After cooling, the reaction mixture is extracted with water and the aqueous layer is made alkaline with 40% aqueous sodium hydroxide followed by extraction with benzene. The benzene solution is dried over anhydrous sodium sulfate and the benzene is removed from the extract by distillation under reduced pressure to give 0.6 g. of oily 1-methoxy-4-chloro-7-ethylimino-1.3.5-cycloheptatriene. Picrate, M.P. 68–169° C.

Example 10

A mixture of 2 g. of 2-amino-7-bromotropone and 4 g. of dimethylsulfate in 20 ml. of toluene is heated under reflux with stirring for 2 hours. After cooling, the reaction mixture is extracted with water and the aqueous layer is made alkaline with aqueous solution of sodium hydroxide followed by extraction with benzene. The benzene solution is dried over sodium sulfate and the benzene is removed from the extract by distillation under reduced pressure to give 0.4 g. of oily 1-methoxy-2-bromo-7-imino-1.3.5-cycloheptatriene. Picrate, M.P. 164° C.

Example 11

A mixture of 1.5 g. of 2-amino-7-methyltropone and 3 g. of dimethylsulfate in 15 ml. of toluene is heated under reflux with stirring for 2 hours After cooling, the reaction mixture is extracted with water and the aqueous layer is made alkaline with aqueous sodium hydroxide followed by extraction with benzene. The benzene solution is dried over sodium sulfate and the benzene is removed from the extract under reduced pressure to give 0.4 g. of oily 1-methoxy-2-methyl-7-imino-1.3.5-cycloheptatriene. Picrate, M.P. 164–165° C.

Example 12

A mixture of 3 g. of 2-amino-7-phenyltropone and 6 g. of dimethylsulfate in 30 ml. of dioxane is heated under reflux with stirring for 1 hour. After cooling, the reaction mixture is concentrated to remove most of the dioxane and water is added to the residue. The aqueous mixture is washed with benzene and made alkaline with aqueous solution of sodium hydroxide followed by extraction with benzene. The benzene extract is dried over sodium sulfate and the benzene is removed by distillation under reduced pressure to give 0.8 g. of oily 1-methoxy-2-phenyl-7-imino-1.3.5-cycloheptatriene. Picrate, M.P. 169° C.

Example 13

A mixture of 1.0 g. of 2-amino-5-nitrotropone and 15 ml. of dimethylsulfate is heated with stirring at 120–130° C. for 2 hours. After cooling, water is added to the reaction mixture to precipitate crystals, which are separated by filtration. The filtrate is washed with benzene. To the aqueous solution is added aqueous solution of picric acid to give picrate of 1-methoxy-4-nitro-7-imino-1.3.5-cycloheptatriene melting at 192–195° C. (dec.); yield 0.6 g.

Example 14

A mixture of 0.9 g. of 7-methoxy-2-aminotropone and 2.0 ml. of dimethylsulfate in 20 ml. of toluene is heated under reflux with stirring for 3.5 hours. After cooling, the reaction mixture is extracted with water and the aqueous solution is made alkaline with sodium hydroxide followed by extraction with benzene. The benzene extract is dried over potassium carbonate and the benzene is removed by distillation under reduced pressure to give 0.4 g. of oily 1.2-dimethoxy-7-imino-1.3.5-cycloheptatriene. Picrate, M.P. 160° C.

Example 15

A mixture of 0.76 g. of 2-amino-4-isopropyl-7-bromotropone and 5 ml. of dimethylsulfate is heated with stirring at 110–120° C. for 5 hours. The reaction mixture is concentrated under reduced pressure followed by addition of water. The resulting mixture is washed with benzene and the aqueous solution is made alkaline with 40% aqueous sodium hydroxide, followed by extraction with benzene. The benzene extract is dried over sodium sulfate and the benzene is removed by distillation under reduced pressure to give 0.4 g. of oily 1-methoxy-2-bromo-5-isopropyl - 7 - imino - 1.3.5 - cycloheptatriene. Picrate, M.P. 142–140° C.

Example 16

A mixture of 0.5 g. of 2-amino-4-isopropyltropone and 3.2 ml. of dimethylsulfate is heated at 110° C. for 5 hours. After cooling, water and benzene are added to the reaction mixture and the resulting mixture is shaken. The aqueous layer is separated and made alkaline with sodium hydroxide followed by extraction with benzene. The benzene extract is dried over potassium carbonate and the benzene is removed by distillation under reduced pressure to give 0.5 g. of oily 1-methoxy-5-isopropyl-7-imino-1.3.5-cycloheptatriene. Picrate, yellow crystals melting at 210° C. (dec.).

We claim:

1. A compound of the formula

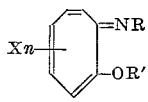

wherein X represents hydrogen, chloro, bromo, alkyl of 1 to 3 carbon atoms, methoxy, nitro or phenyl and can be the same or different when $n$ is 2, $n$ is an integer of 1 to 2, R represents hydrogen, alkyl of 1 to 2 carbon atoms, dimethylamino, β-dimethylaminoethyl, phenylamino, p-tolyl or benzyl and R' is alkyl of 1 to 2 carbon atoms.

2. 1-methoxy-7-imino-1.3.5-cycloheptatriene.
3. 1-ethoxy-7-imino-1.3.5-cycloheptatriene.
4. 1-methoxy-7-methylimino-1.3.5-cycloheptatriene.
5. 1-methoxy-7-benzylimino-1.3.5-cycloheptatriene.
6. A process for preparing a compound having the formula

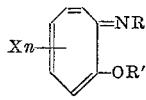

wherein X represents hydrogen, chloro, bromo, alkyl of 1 to 3 carbon atoms, methoxy, nitro or phenyl and can be the same or different when $n$ is 2, $n$ is an integer of 1 or 2, R represents hydrogen, alkyl of 1 to 2 carbon atoms, dimethylamino, β-dimethylaminoethyl, phenylamino, p-tolyl or benzyl and R' represents alkyl of 1 to 2 carbon atoms which comprises reacting a compound having the formula

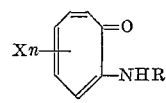

wherein R, X and $n$ have the same meanings as set forth above with a compound selected from the group consisting of lower alkyl sulfates and lower alkyl-benzene- and toluene-sulfonates.

7. A process as claimed in claim 6, wherein the reaction is carried out in the presence of a solvent at the refluxing temperature of the solvent.

8. A process as claimed in claim 6, wherein the reaction is carried out at a temperature of about between 100–150° C.

No references cited.

CHARLES B. PARKER, *Primary Examiner.*

ROBERT V. HINES, *Assistant Examiner.*